United States Patent [19]

Reichgott et al.

[11] Patent Number: 4,511,676

[45] Date of Patent: Apr. 16, 1985

[54] METHOD FOR CLEANING ORGANICALLY FOULED ANION EXCHANGE RESINS USING DIETHYLENE GLYCOL COMPOUND OR DERIVATIVE

[75] Inventors: David W. Reichgott; Michael J. Leary, both of Richboro, Pa.

[73] Assignee: Betz Laboratories, Inc., Trevose, Pa.

[21] Appl. No.: 521,296

[22] Filed: Aug. 8, 1983

[51] Int. Cl.³ .............................................. C08D 5/20
[52] U.S. Cl. ..................................................... 521/26
[58] Field of Search ......................................... 521/26

[56] References Cited

U.S. PATENT DOCUMENTS 2,718,489  9/1955  Coonradt et al. ..................... 521/26
3,093,192  3/1963  Davison et al. ...................... 528/494
3,748,285  7/1973  Wiltsey et al. ....................... 252/531

FOREIGN PATENT DOCUMENTS 527521  7/1956  Canada ................................. 521/26

Primary Examiner—Paul R. Michl
Assistant Examiner—Peter F. Kulkosky
Attorney, Agent, or Firm—Alexander D. Ricci; Bruce E. Peacock

[57] ABSTRACT

A method for cleansing organically fouled anionic exchange resins is disclosed wherein, in addition to cleansing with caustic and/or brine, the fouled resin is contacted with an effective diethylene glycol compound or derivative thereof.

11 Claims, No Drawings

METHOD FOR CLEANING ORGANICALLY FOULED ANION EXCHANGE RESINS USING DIETHYLENE GLYCOL COMPOUND OR DERIVATIVE

FIELD OF THE INVENTION

The present invention pertains to an improved method for cleaning organically fouled anionic exchange resins by the use of an effective diethylene glycol compound or derivative thereof in combination with the heretofore traditional use of brine and/or caustic cleaning solutions.

BACKGROUND

The fouling of anion resins has posed a problem that has confronted ion exchange applications since their inception. Humic substances found in surface waters are high molecular weight polyfunctional organic acids (both carboxylic and phenolic) formed from the breakdown of plant and animal materials. In demineralizer operations, the large organic molecules may coat the resin bead, blocking and/or entering the pores of an anion exchange resin. These organics are retained because of a high affinity for the exchange sites and hydrophobic interactions with the polymer backbone of the resin.

Since the diffusion rates of the organics within the resin are usually slower than those of inorganic ions, not all of the bonds linking the organic acids to the resin are broken during the regeneration cycle. This situation results in only partial regeneration of the resin and excessive rinse times following regeneration. In severe cases, the resin may become "irreversibly" fouled. To alleviate these problems, out-of-service brine or brine/caustic cleaning has traditionally been performed. It has also been suggested that sodium hypochlorite may also be used as such a cleaning treatment. However, resin degradation may occur with use of such a strong oxidizing agent.

U.S. Pat. No. 3,748,285 (Wiltsey et al) is directed toward compositions and methods for cleaning ion exchange resins. The cleaning composition comprises (a) from 60-90% water, (b) from about 0.5-4% of an unsubstituted, liquid aliphatic hydrocarbon having from 5 to 10 carbon atoms, and (c) from about 0-10% of a wetting agent selected from the group consisting of sulfated alcohols and sulfonated hydrocarbons and having from 6 to 22 carbon atoms. In addition, an organic compound (d) having the formula:

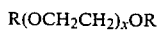

R(OCH$_2$CH$_2$)$_x$OR is also made part of the treatment. In accordance with the disclosed formula, R is independently selected from the group consisting of H, lower aliphatic radicals of from 1-6 carbon atoms and radicals having the formula

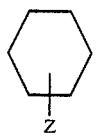

where Z is selected from the group consisting of H and aliphatic hydrocarbon radicals of from 4 to 18 carbon atoms and x is an integer of from about 1 to 20. As to specific (d) compounds disclosed, glycol butyl ether and ethoxylated alkyl phenols are preferred. The gist of the reference is directed toward cationic exchange resins in contrast to the present invention which is directed toward anionic exchange resins. Moreover, Wiltsey et al is concerned with cleansing of hydrocarbon oils from the resins. In contrast, the present invention provides a means for cleansing naturally occurring foulants such as humic acids, lignins, tannins, etc. from anionic exchange resins. Indeed, as shown hereinafter, several of the ethoxylated alkyl phenol compounds have been tested in anionic resin cleaning examples and have proven only marginally effective. Moreover, these ethoxylated alkyl phenols are notorious in their propensity to foam, thus causing severe problems if any leak to the boiler.

Other patents which may be noted of interest include U.S. Pat. Nos. 4,153,761 (Marsh) and 3,536,637 (Noll et al).

Accordingly, there remains a need in the art for resin cleaning materials which may effectively cleanse organic foulants from anionic exchange resins without resulting in resin degradation and/or severe foaming problems. These needs are effectively met by utilization of the resin cleaning methods of the present invention.

DETAILED DESCRIPTION OF THE PRESENT INVENTION

We have surprisingly found that anionic exchange resins are effectively cleaned from organic foulants when they are contacted with an aqueous solution comprising an effective diethylene glycol compound or derivative used in combination with the traditional brine and/or caustic washing. Basically, the treatment comprises the offline washing of the organically fouled anionic exchange resin by an aqueous solution comprising about 0.1%-50% of the diethylene glycol compound or derivative, about 1-2% caustic and from 0-20% brine.

Exemplary compounds falling within the classification of "diethylene glycol compounds or derivatives" include: diethylene glycol monobutyl ether, diethylene glycol monobutyl ether acetate, diethylene glycol monoethyl ether acetate, diethylene glycol monoethyl ether, diethylene glycol dibutyl ether, diethylene glycol monohexyl ether, diethylene glycol monomethyl ether, and diethylene glycol monomethyl ether acetate. All of these compounds are readily available commercially under the Carbitol trademark from Union Carbide.

In addition, diglyme(di ethylene glycol dimethyl ether), ethyl diglyme(diethylene glycol diethyl ether) and tetraglyme(tetra ethylene glycol dimethyl ether) may also be mentioned. These compounds are also readily available.

Accordingly, the diethylene glycol compounds or derivatives may be defined as having the formula

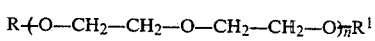

R$+$O—CH$_2$—CH$_2$—O—CH$_2$—CH$_2$—O$)_n$R$^1$ wherein R and R$^1$ are independently selected from the group consisting of C1-C8 lower alkyl, acyl, and hydrogen; n is equal to 1 or 2. Of these materials, the use of diethylene glycol monomethyl ether (sometimes referred to as Methyl Carbitol) is preferred. At present, a preferred cleaning solution, to be used in conjunction with caustic and/or brine cleaning, comprises about 36% diethylene glycol monomethyl ether, about 4% isopropanol, remainder water.

The resin cleaning agents of the invention may be employed in the cleaning of strong base anion exchange resins or weak base anion exchange resins.

A strong base anion resin of the quaternary amine type in the hydroxide form will exchange the hydroxide ions for the anions of strong and weak acids as well as for the anions of salts (salt-splitting). A weak base resin differs from the strong base in that the functional group usually consists of a primary, secondary, or tertiary amine, which bears a charge due to the acidic effluent of the cationic exchange resin. The weak base resin will not remove the anions of weak acids or salts from solution. The weak base resins remove the anions of strong mineral acids and organics from solution. The weak base resin is less prone to fouling from organics than is the strong base resin and consequently precedes (protects) the strong base anion exchanger in an ion exchange train. It is also familiar to those skilled in the art that brine may not be required to enhance caustic cleaning.

EXAMPLES

The invention will now be further described with reference to a number of specific examples which are to be regarded solely as illustrative and not as restricting the scope of the invention.

In order to demonstrate the efficacy of the resin cleaning agents in accordance with the invention, effluent from a treated resin was analyzed to ascertain the Total Organic Carbon (TOC) content thereof. Samples treated in accordance with the invention were compared to control values. TOC content higher than control values indicates efficacy of the cleaning agents.

In order to determine the TOC values for cleaned (treated) resins, a spectrophotometric method utilizing Beer's law and a Bausch and Lomb Spectronic 20 instrument was devised. Since the cleaning agents (which themselves contain organic carbon) were tested as adjuncts to brine/caustic solutions, the caustic and/or brine-caustic effluent from the cleaned resin (no cleaning agents of the present invention added) was analyzed for TOC by a Combustion/IR Spectroscopy method in which all of the organic found in the effluent is first converted to $CO_2$ which is then detected by IR analysis. Then, absorbance measurements on dilutions of the known TOC samples were made at several wavelengths, resulting in absorbance vs. concentration (TOC) reference curves. Absorbance measurements on effluent solutions from resin samples cleaned with the resin cleaning agents of the present invention were made, and the TOC values for each effluent were determined from the reference curves.

Table I hereinbelow gives the results for materials evaluated as cleaning agents in demineralized water three-hour static soak tests in combination with caustic and brine. In each instance in which a material in accordance with the invention was tested, only a 1% (weight) aqueous solution of each was used.

TABLE I

Evaluation of Cleaning Agents
Under Static Soak Conditions
STRONG BASE RESIN

Procedure - 50 grams of a drained, fouled resin were placed in a 600 ml beaker. Each tested cleaning solution comprised a 1% (weight) concentration of the cleaning agent along with 10% NaCl and 1% NaOH (unless otherwise noted) in demineralized water. The thus treated resins were agitated and then allowed to stand at room temperature over a three hour period. The TOC of the resulting effluents was then determined in accordance with the spectrophotometric method outlined above.

| Treatment | TOC (ppm) |
|---|---|
| ethoxylated poly ether (Pluronic F-108) | 2240 |
| ethoxylated nonyl phenol (Surfonic N-95) | 2240 |
| ethoxylated phenol phosphate ester (Triton QS44) | 1340 |
| alkyl sulfosuccinate | 1840 |
| ethoxylated octyl phenol (Triton X-100) | 1980 |
| alkyl napthalene sulfonate (Tamol SN) | 1340 |
| ethoxylated poly ether (Pluronic L62) | 1700 |
| diethylene glycol mono ethyl ether (Carbitol solvent) | 2240 |
| brine-caustic control | 2220 |
| Brine Caustic Control | 2860 |
| diglyme (diethylene glycol dimethyl ether) | 2360 |
| ethyl diglyme (diethylene glycol dimethyl ether) | 2360 |
| tetraglyme (tetra ethylene glycol dimethyl ether) | 2860 |

Table II lists the results corresponding to the use of varying concentrations of the resin cleaning agents of the present invention in brine-caustic beaker tests. A definite increase in color intensity of the effluent from treated resins was noticed in each instance.

TABLE II

Strong Base Resin

Procedure - A 10% (weight) NaCl and 1% NaOH control solution was used as a basis for comparison with a 10% NaCl, 1% NaOH, 30% aqueous solution of diethylene glycol mono methyl ether (Methyl Carbitol). In each instance, a one hour soak cycle preconditioning step with brine-caustic cleaning was first performed. The resin sample was then rinsed two times with demineralized $H_2O$. The diethylene glycol mono methyl ether caustic and brine solution was added and the resin sample were subjected to another one hour soak cycle. The resin was then cleaned with demineralized water prior to immersion into the cleaning solution again for a third one hour soak cycle. TOC values were determined by the spectrophotometric method outlined above.

| Treatment | Test Conditions | TOC (ppm) | % Increase in Efficacy |
|---|---|---|---|
| Brine-Caustic Control | 2nd 1 hr Soak Cycle | 820 | |
| Brine-Caustic - 30% diethylene glycol mono methyl ether (Methyl Carbitol) | | 1250 | 52 |
| Brine-Caustic Control | 3rd 1 hr Soak Cycle | 540 | |
| Brine-Caustic 30% diethylene glycol mono methyl ether | | 800 | 48 |

Table III gives the test results for several resin cleaning materials of the present invention on a weak base anion exchange resin as contrasted to certain of the surfactants of the type disclosed in U.S. Pat. No. 3,748,285 (Wiltsey et al). Although certain of these alkyl ethoxylated phenol type surfactants increased effluent TOC content, these materials produce excessive foam and would therefore likely cause foaming problems and would probably lead to long rinse times between the resin cleaning and regeneration cycles.

TABLE III

Evaluation of Cleaning Agents for a Weak Base Anion Exchange Resin

| Sample | Test Conditions | TOC ppm | % Increase In Efficacy |
|---|---|---|---|
| 1% NaOH - control | 1 hr. - room temp | 322 | — |
| 10% ethoxylated octyl phenol | " | 396 | 23 |
| 10% diethylene glycol mono ethyl ether | " | 326 | — |
| 10% ethoxylated nonyl | | 396 | 23 |

TABLE III-continued

Evaluation of Cleaning Agents for a Weak Base Anion Exchange Resin

| Sample | Test Conditions | TOC ppm | % Increase In Efficacy |
|---|---|---|---|
| 1% NaOH - control | 1st 1 hr. Soak Discarded Cleaners Added to 2nd 1 hr. test | 56 | — |
| 10% ethoxylated octyl phenol | | 110 | 96 |
| 10% diethylene glycol mono ethyl ether | | 78 | 39 |
| 10% ethoxylated nonyl phenol | | 110 | 96 |
| 1% NaOH - control | Same | 56 | — |
| 10% ethoxylated octyl phenol (9 E.O.) | | 84 | 50 |
| 10% ethoxylated octyl phenol (9.5 E.O.) | | 90 | 61 |
| 10% ethoxylated octyl phenol (10-11 E.O.) | | 80 | 43 |
| 10% ethoxylated octyl phenol (12 E.O.) | | 80 | 43 |
| 10% ethoxylated octyl phenol (20 E.O.) | | 76 | 36 |
| 1% NaOH - control | Same | 38 | — |
| 30% methyl Carbitol | | 60 | 58 |

Test Conditions—50 gms fouled weak base anionic resin. 100 mls test solution—room temperature. All samples contain 1% NaOH.

ION EXCHANGE RESIN COLUMN STUDIES

Two samples of fouled strong base anion resin were cleaned in beaker tests with brine-caustic and brine-caustic plus 30% Methyl Carbitol. The cleaned resin samples plus an "as received" sample were further evaluated in a laboratory ion exchange experiment to determine the effect of resin cleaning on anion exchange capacity. The resin sample to be evaluated was placed in a ½"×4' resin column, backwashed, regenerated with 200 mls of 4% sodium hydroxide and rinsed. 125 ppm sodium chloride in demineralized water at room temperature was used as the exhausting solution. As the chloride ion exchanged with the hydroxide ion, the pH of the effluent increased to a steady-state pH value in the 10.5 to 11.0 range. When the resin was exhausted, a pH drop occurred as the chloride ion replaced the hydroxide ion in the effluent. The effluent pH was monitored using a digital pH meter and recorder, and the effluent volumes were measured accurately. Breakthrough (or resin exhaustion) occurred when the drop in pH took place. The total volume of the sodium chloride solution passed through before the pH decreased was used as a measure of the exchange capacity of the resin.

An increase in exchange capacity by the brine-caustic cleaned sample over the "as received" sample was noted. A definite increase in capacity was observed for the methyl Carbitol cleaned resin over the brine-caustic cleaned sample.

Another set of experiments was conducted entirely in the resin column (i.e., the cleaning cycle as well as the regeneration cycle were performed on the resin in the column at room temperature). A brine-caustic control and a brine-caustic-30% methyl Carbitol solution were evaluated. These samples were cleaned by passing 200 mls of the brine-caustic or brine-caustic-30% Methyl Carbitol solution through the resin column, rinsed with demineralized water, regenerated with 4% sodium hydroxide, and again rinsed with demineralized water. 125 ppm sodium chloride exhausting solution was again passed over the resin. Again, the Methyl Carbitol treatment was found to exhibit an increase in exchange capacity when compared with the brine-caustic control.

EVALUATION OF METHYL CARBITOL FORMULATIONS

A formulation consisting of (weight %) 36% Methyl Carbitol, 4% isopropanol, and the remainder water was tested to determine the TOC content of effluent from a treated resin compared to the TOC content of a control standard in accordance with the procedures explained hereinabove. Results are reported in Table IV.

TABLE IV

| Resin | Sample | Test Conditions | TOC (ppm) | % Increase In Efficacy |
|---|---|---|---|---|
| A | Control (brine-caustic) | Brine-Caustic | 1,090 | |
| | 10% Z (Active) | Gang Stirrer-2 hrs | 1,250 | 15 |
| | 20% Z (Active) | | 1,400 | 28 |
| | 20% Methyl Carbitol | | 1,430 | 31 |
| B | Control (brine-caustic) | Same | 1,030 | |
| | 10% Z (Active) | | 1,270 | 23 |
| | 20% Z (Active) | | 1,480 | 44 |
| | 20% Methyl Carbitol | | 1,500 | 46 |
| C | Control (brine-caustic) | Same | 875 | |
| | 20% Z (Active) | | 1,200 | 37 |
| D | Control (brine-caustic) | Same | 450 | |
| | 1% Z (Active) | | 490 | 9 |
| | 5% Z (Active) | | 540 | 20 |
| | 10% Z (Active) | | 630 | 40 |
| | Control (brine-caustic) | Same | 440 | |
| | 20% Z (Active) | | 830 | 89 |
| E | Control (brine-caustic) | Same | 1,060 | |
| | 1% Z (Active) | | 1,100 | 4 |
| | 10% Z (Active) | | 1,250 | 18 |
| | 20% Z (Active) | | 1,390 | 31 |

Resins A, B, C, D, and E are strong base anion exchange resins.

Z is 36% methyl Carbitol; 4% isopropanol; remainder water.

An additional set of experiments was conducted in the field on an industrial ion exchange system. Two vessels, each containing 135 ft³ of fouled strong base anion exchange resin, were treated by the elution of 1000 gallons of cleaning solution. For the first unit (I), the solution contained 10% brine, 1% caustic, and 20% (active) formulation Z; for the second unit (II) the solution was the same except that formulation Z was absent. Service run throughput was measured to the appearance of silica in the effluent. Table V shows the influence of formulation Z:

TABLE V

| | I | | II | |
|---|---|---|---|---|
| Unit Period | Before Cleaning | After Cleaning | Before Cleaning | After Cleaning |
| Average throughput (thousands of gal.) | 399 | 519 | 356 | 362 |
| Change | +30% | | +2% | |

DISCUSSION

As Table I indicates, the diethylene glycol compounds, specifically, diglyme, Carbitol solvent, ethyl diglyme, and tetraglyme were all approximately equal in their cleansing ability as measured by the TOC content of the cleansing effluent.

Table II demonstrates that diethylene glycol mono methyl ether (Methyl Carbitol) provides significant cleansing improvement when used in combination with brine-caustic anion resin cleaning.

As Table III indicates, Methyl Carbitol may also be used as a cleansing agent for weak base anion resins. Use of this particular species of diethylene glycol compounds has also minimized foaming problems which otherwise tend to occur upon use of the Wiltsey et al ethoxylated alkyl phenol surfactants.

Moreover, the "Ion Exchange Resin Column Studies" indicate that an increase in anion exchange capacity of the tested resins is observed for the resin samples cleaned with Methyl Carbitol.

The preferred Methyl Carbitol containing formulation was tested and shown efficacious in Table IV. Significant improvement over the brine-caustic control run is shown. Further, the field tests demonstrate that use of the preferred Methyl Carbitol formulation increases the ion exchange capacity of the resin over and above that increase caused by brine and caustic treatment.

It can thus be seen that the disclosed invention carries out the objects of the invention set forth above. In accord with the patent statutes, the best mode of practicing the invention has been set forth. However, it will be apparent to those skilled in the art that many other modifications can be made without departing from the invention herein disclosed and described, the scope of the invention being limited only by the scope of the attached claims.

We claim:

1. In a method of removing organic foulants selected from the group consisting of humic acids, lignins, and tannins from an anionic exchange resin wherein said fouled resin is treated with a member or members selected from the group consisting of brine and caustic to aid in removal of said foulants, the improvement comprising also contacting said fouled resin with an aqueous composition comprising an effective diethylene glycol compound or derivative, said diethylene compound or derivative having the formula:

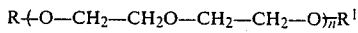

wherein R and $R^1$ are independently selected from the group consisting of lower alkyl, acyl, and hydrogen, $n = 1$ or 2.

2. An improved method as defined in claim 1 wherein said diethylene glycol compound or derivative is present in said aqueous composition in an amount of from about 0.1%–50% (weight).

3. An improved method as defined in claim 1 wherein said anionic exchange resin comprises a strong base anionic exchange resin.

4. An improved method as defined in claim 1 wherein said anionic exchange resin comprises a weak base anionic exchange resin.

5. An improved method as defined in claim 1 wherein said diethylene glycol compound or derivative is chosen from the group consisting of diethylene glycol monobutyl ether, diethylene glycol monobutyl ether acetate, diethylene glycol monoethyl ether acetate, diethylene glycol mono ethyl ether, diethylene glycol dibutyl ether, diethylene glycol diethyl ether, diethylene glycol monohexyl ether, diethylene glycol monomethyl ether, diethylene glycol monomethyl ether acetate, diethylene glycol dimethyl ether, and tetra ethylene glycol dimethyl ether.

6. An improved method as defined in claim 1 wherein said diethylene glycol compound or derivative comprises diethylene glycol monomethyl ether.

7. An improved method as defined in claim 1 wherein said diethylene glycol compound or derivative comprises diethylene glycol monoethyl ether.

8. In a method of removing organic foulants selected from the group consisting of humic acids, lignins, and tannins from an anionic exchange resin wherein said fouled resin is treated with a member or members selected from the group consisting of brine and caustic to aid in removal of said foulants, the improvement comprising also contacting said fouled resin with an aqueous composition comprising diethylene glycol monomethyl ether.

9. An improved method as recited in claim 8 wherein said aqueous composition comprises about 60% (weight) water, about 36% (weight) diethylene glycol monomethyl ether, and about 4% (weight) isopropanol.

10. An improved method as recited in claim 8 wherein said anion exchange resin is a strong base anion exchange resin.

11. An improved method as recited in claim 8 wherein said anion exchange resin is a weak base anion exchange resin.

* * * * *